United States Patent
Kadoi et al.

(10) Patent No.: US 7,428,068 B2
(45) Date of Patent: Sep. 23, 2008

(54) PRINTING SYSTEM, PRINTING SYSTEM CONTROL METHOD, PROGRAM AND STORAGE MEDIUM

(75) Inventors: Yurika Kadoi, Kanagawa (JP); Shinichi Yuga, Kanagawa (JP); Nobushige Aoki, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 915 days.

(21) Appl. No.: 10/681,152

(22) Filed: Oct. 9, 2003

(65) Prior Publication Data

US 2004/0078751 A1     Apr. 22, 2004

(30) Foreign Application Priority Data

Oct. 18, 2002    (JP) .............................. 2002-303940

(51) Int. Cl.
*G06F 15/00*     (2006.01)
*G06F 15/173*     (2006.01)

(52) U.S. Cl. ....................................... 358/1.15; 709/224

(58) Field of Classification Search ................ 358/1.15, 358/1.16, 1.18, 1.14, 1.9; 715/500, 738; 707/1, 10, 14–15; 709/9, 224, 245; 400/76, 400/582; 705/14, 77

See application file for complete search history.

(56) References Cited

U.S. PATENT DOCUMENTS

2001/0019416 A1*   9/2001   Monty et al. .................. 358/1.9

OTHER PUBLICATIONS

U.S. Appl. No. 10/687,748, filed Oct. 20, 2003.

* cited by examiner

*Primary Examiner*—Saeid Ebrahimi Dehkordy
(74) *Attorney, Agent, or Firm*—Fitzpatrick, Cella, Harper & Scinto

(57) ABSTRACT

A printing system is arranged so that each time a storage button disposed on an operation panel of a printer is operated, an interrupt event transferred from the printer to the computer is detected at the computer, and in accordance with the detected interrupt event, image data in a memory card mounted on a card slot of the printer is stored on a hard disk of the computer, and that each time a print start button disposed on the operation panel of the printer is operated, an interrupt event transferred from the printer to the computer is detected, and in accordance with the detected interrupt event, image data read from the memory card and image data stored on the hard disk of the computer is both printed.

8 Claims, 9 Drawing Sheets

FIG. 10

STORAGE MEDIUM SUCH AS FD/CD-ROM

DIRECTORY INFORMATION

FIRST DATA PROCESSING PROGRAM

PROGRAM CODE GROUP CORRESPONDING TO STEPS IN FLOW CHART SHOWN IN FIG.7

SECOND DATA PROCESSING PROGRAM

PROGRAM CODE GROUP CORRESPONDING TO STEPS IN FLOW CHART SHOWN IN FIG.8

THIRD DATA PROCESSING PROGRAM

PROGRAM CODE GROUP CORRESPONDING TO STEPS IN FLOW CHART SHOWN IN FIG.9

PRINTING SYSTEM, PRINTING SYSTEM CONTROL METHOD, PROGRAM AND STORAGE MEDIUM

BACKGROUND OF THE INVENTION

1. Field of the Invention

The present invention relates to controlling a printing system which stores image data on a recording medium of a printer in a host computer and prints the stored image data, the printer having a card slot capable of inserting a recording medium for recording a digital still image, an operation panel for receiving a print setting instruction from a user, and a communication interface for transferring information to and from the host computer.

2. Related Background Art

Some conventional printers have a card slot capable of inserting a recording medium for recording a digital still image (hereinafter abbreviated simply to an image). Some of such printers have the function of storing image data in a hard disk of a personal computer (hereinafter abbreviated to a PC) after a recording medium is inserted into a card slot of the printer connected to PC.

Some of such printers have an operation unit for instructing data storage to store image data in PC upon operation on the operation unit.

Although a conventional printer has a function of storing data in PC, stored image data is required to be browsed, edited or printed by using software running on PC and operating a mouse or a keyboard connected to PC. A user not familiar with operations on PC feels much anxiety and cannot always print easily.

In such conventional printers, both image data already stored in PC and image data on a recording medium inserted into the card slot of a printer cannot be selected at a time to print them in the same layout.

SUMMARY OF THE INVENTION

It is an object of the invention to solve all or at least one of the above-described problems.

One feature of this invention resides in that even a novice user of PC can easily print an image stored in a recording medium of PC.

Another feature of this invention resides in that an image on a storage medium of PC can be printed by using an operation unit of a printer having operation buttons smaller in number than operation buttons of PC.

In order to realize such features, the invention discloses a printing system which includes a printer and a computer each including a communication interface for transferring information therebetween, wherein the printer comprises: an operation panel for entering a store instruction and a print instruction of image data to be read out from a memory readable by the printer; an operation panel controller for notifying the instruction entered from the operation panel to the computer by generating an interrupt event; and a printer engine for printing, and wherein the computer comprises: a data transfer unit for transferring and receiving an image and print data to and from the printer; an interrupt controller for detecting the interrupt event sent from the printer; a storage control unit for storing data from the memory into a storage area in accordance with the interrupt event detected by the interrupt controller; and an output control unit for outputting as print data the data stored in the storage area to the printer in accordance with the notified interrupt event.

Other features and advantages of the present invention will become apparent from the following description of embodiments taken in conjunction with the accompanying drawings.

BRIEF DESCRIPTION OF THE DRAWINGS

FIG. 10 is a schematic diagram showing a memory map of a storage medium for storing various data processing programs readable by the printing system of the embodiment.

DETAILED DESCRIPTION OF THE PREFERRED EMBODIMENTS

Figure 1:
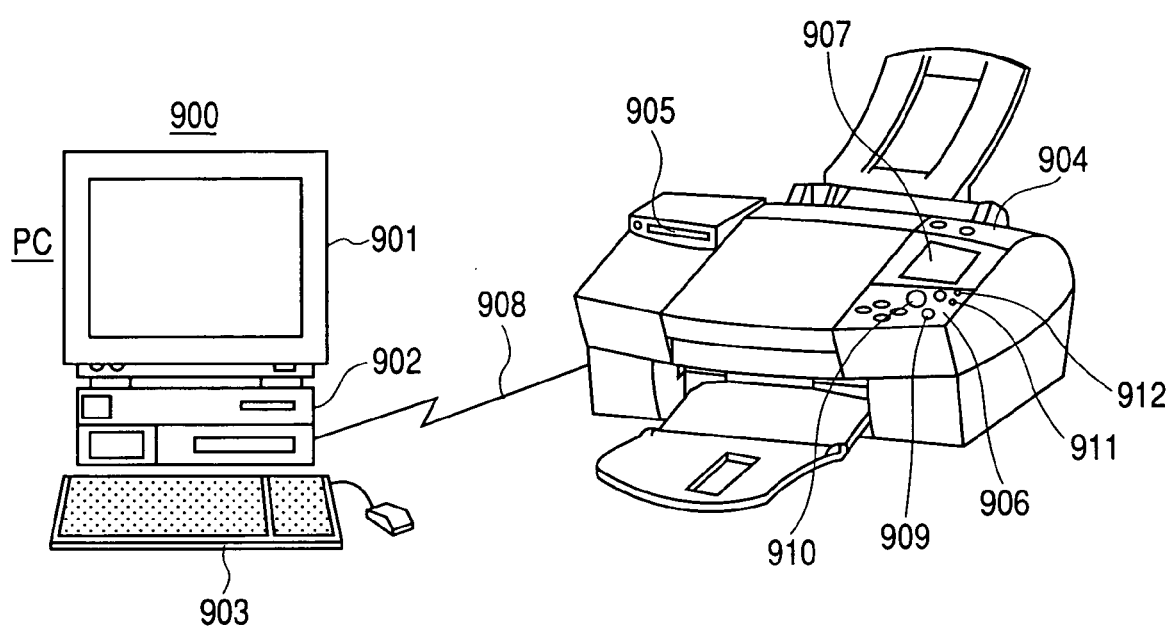
FIG. 1 is a diagram showing an example of a printing system according to an embodiment.

FIG. 1 is a diagram showing an example of a printing system according to an embodiment of the invention. This system is constituted of an information processing apparatus 900 (PC: a display device 901, a controller 902, an input device 903 and the like) and an ink jet printer (printer) 904, respectively interconnected by a USB (Universal Serial Bus) interface for example. The printer has a direct print function of directly reading and printing image data conformal to a predetermined standard stored in a memory device (memory card) to be mounted on a digital camera or the like or directly reading and printing image data conformal to a predetermined standard stored in a memory device of a digital camera which can communicate with the printer via a predetermined interface.

In the printer 904 shown in FIG. 1, reference numeral 905 denotes a media slot into which a memory device to be mounted on an unrepresented digital camera is inserted. Reference numeral 906 denotes an operation panel on which various operation buttons and keys are disposed. A print form can be set by selecting a print setting menu displayed on a liquid crystal panel 907.

The printing system of the embodiment interconnects PC 900 and the printer 904 by communication means (e.g., USB) capable of bidirectional communications. The printer has the card slot 905 capable of inserting a memory card such as a compact flash (registered trademark) and the operation panel 906 constituted of the liquid crystal panel and buttons for performing various print settings and print operations.

In the printer 904, image data picked up with a digital camera and stored in a memory card can be printed by inserting the card into the card slot 905 and performing print settings on the operation panel 906. Without using PC, the printer alone can print image data on a designated paper in a designated layout, at print quality and the like. The print process by the printer alone is called hereinafter a direct print where applicable.

In the printing system of the embodiment, the operation panel 906 has a viewer button 909. When the viewer button 909 is depressed, an application is activated on PC 900 to perform a preview display in accordance with the print setting entered from the operation panel 906. When the print setting is changed by using the operation panel 906, the preview display is updated properly. When the viewer button 909 is again depressed, the application is terminated.

The operation panel 906 has also a save button 911. When the save button 911 is depressed, image data on the memory card can be stored onto a hard disk of PC.

The operation panel 906 has also a delete button 912. When the delete button 912 is depressed, image data stored on the hard disk of PC 900 upon operation of the save button 911 can be deleted.

When a print start button 910 on the operation panel 906 is depressed, the above-mentioned direct print is performed. In case that the printer 904 and PC 900 can communicate each other, the direct print is not performed but a print process is executed by PC 900 to process image data on the memory card and image data stored on the hard disk of PC 900 upon operation of the save button 911.

In the printing system of the embodiment, not only image data on the memory card but also image data stored on the hard disk of PC 900 upon operation of the save button 911 can be pre-viewed and printed only upon operations of the operation panel of the printer.

In the following, the details of the printing system of the embodiment will be described.

Figure 2:
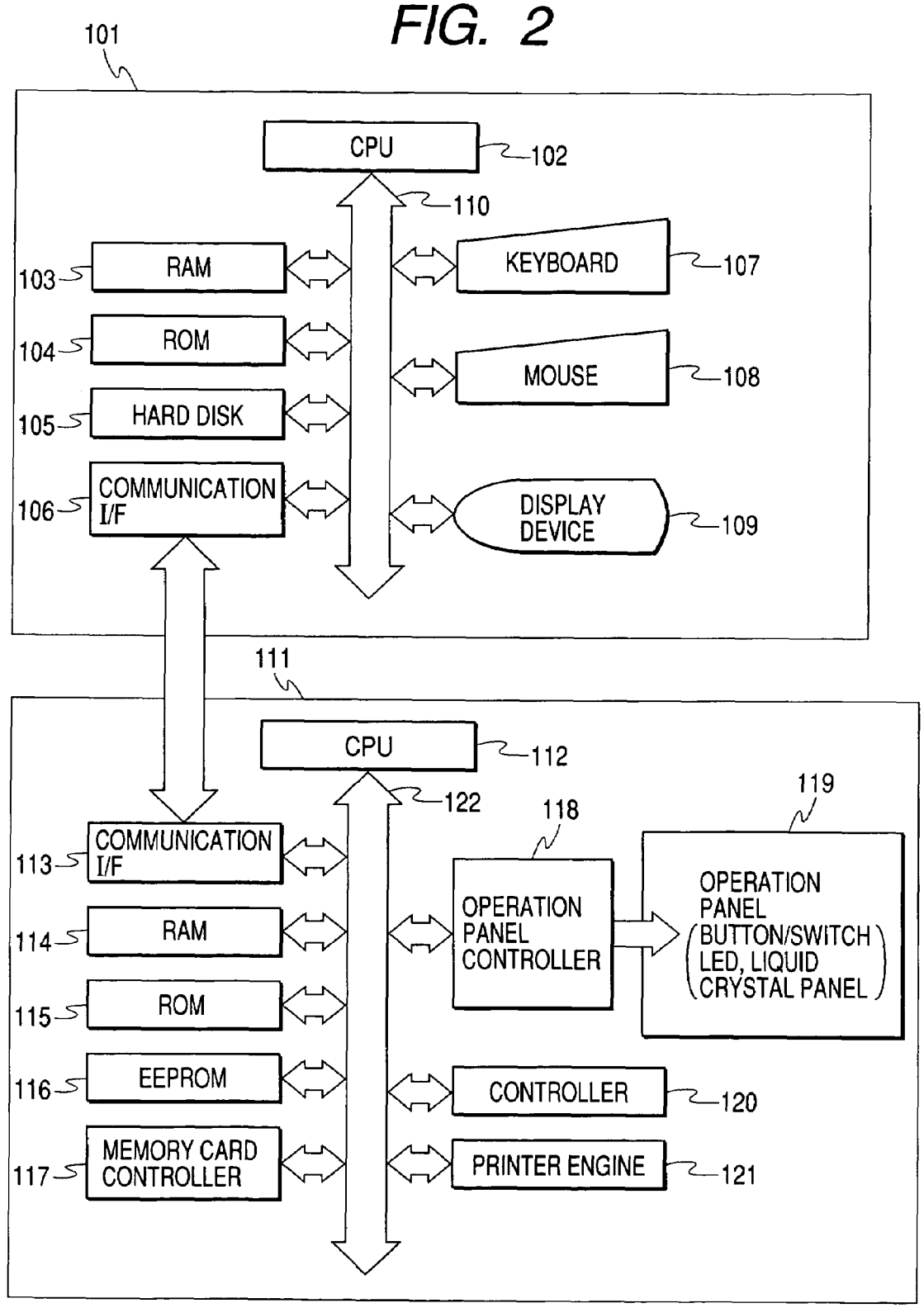
FIG. 2 is a block diagram showing the structure of the printing system according to an embodiment.

FIG. 2 is a block diagram showing the structure of a printing system according to an embodiment of the invention. The printing system has a printer 111 (corresponding to the printer 904 shown in FIG. 1) and a PC 101 (corresponding to PC 900 shown in FIG. 1).

Referring to FIG. 2, PC 101 is constituted of: a central processing unit (CPU) 102 for computing, judging and controlling data and instructions; a storage device including a RAM 103, a ROM 104, a hard disk 105 and the like for storing an operating system (hereinafter abbreviated to an OS) and other programs; a communication interface 106 such as USB, SCSI and wireless for data communications with the printer; an input device such as a keyboard 107 and a mouse 108 to be used as a user interface; a display device 109 constituted of a graphics-controller and a CRT, a liquid crystal display or the like; and a system bus 110.

The printer 111 is constituted of a central processing unit (CPU) 112 for computing, judging and controlling data and instructions; a RAM 114 to be used as a temporary storage area for various data and as a printer buffer; a ROM 115 which is a storage area dedicated to reading an operating system and other control programs; a non-volatile memory (EEPROM) 116 to be used as a storage area for printer engine information and the like; a communication interface 113 for bidirectional communications with PC; a memory card controller 117 for reading data from a memory card; an operation panel 119 and an operation panel controller 118, constituted of various buttons and switches to be used for power-on, reset, various print settings, print start, print abort, storage start, storage abort and the like, an LED, a liquid crystal panel and the like; a controller 120 constituted of an image processing ASIC and the like; and a printer engine 121 including an LF motor, a carriage motor, a print head and various sensors.

The printing system of the embodiment will be described by using as an example a Universal Serial Bus (hereinafter abbreviated to a USB) for communications between PC and the printer. The USB data transfer scheme as the communication interface of the printing system of this embodiment deals with a bulk transfer scheme suitable for transfer of a large amount of data and an interrupt transfer scheme suitable for communications with a user interface such as a mouse. The bulk transfer scheme is utilized for transfer of image data and print data, and the interrupt transfer scheme is used for transfer of operation panel data.

Figure 3:
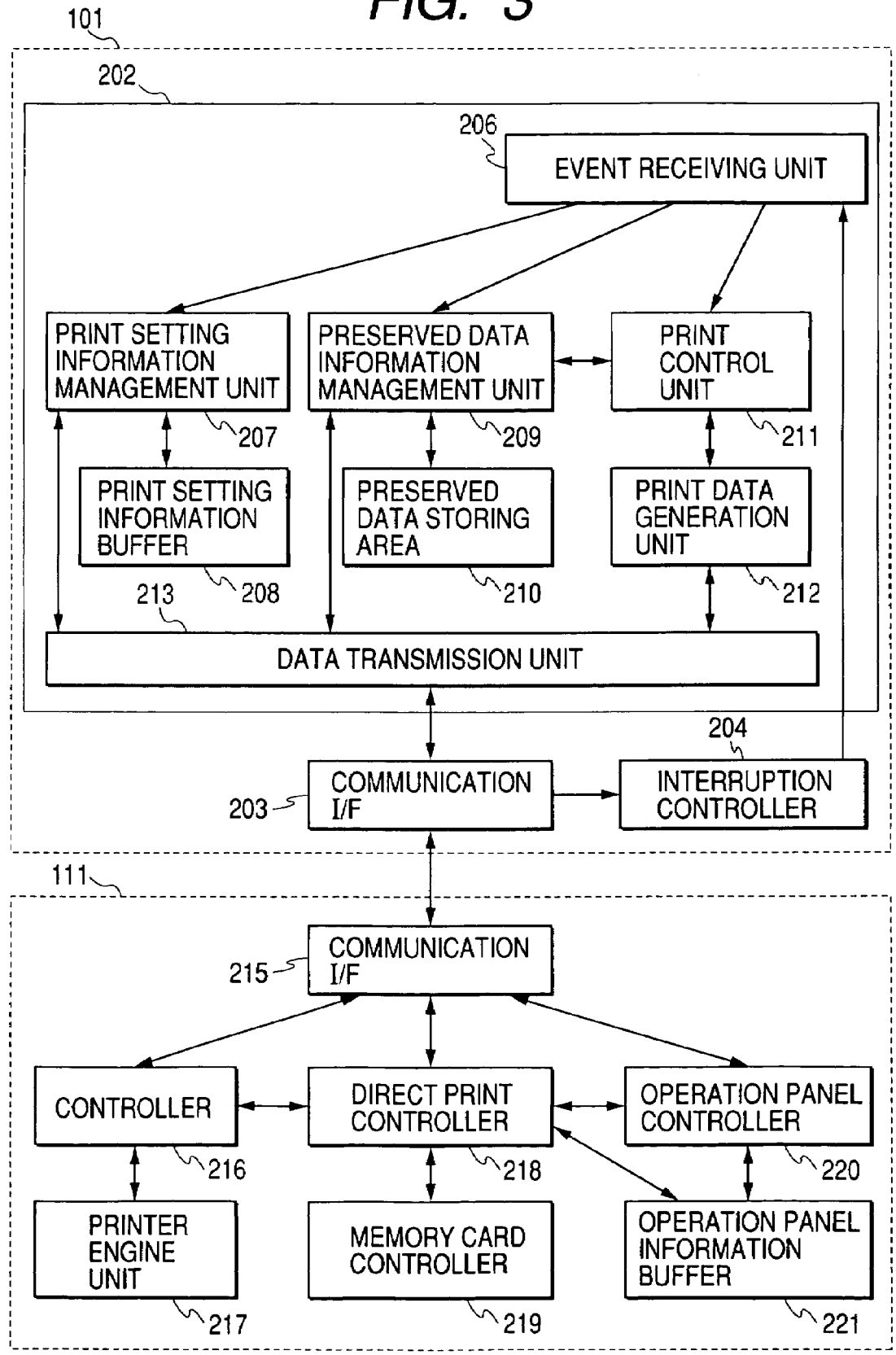
FIG. 3 is a block diagram showing a data processing structure of the printing system shown in FIG. 2.

FIG. 3 is a block diagram showing the data processing structure of the printing system shown in FIG. 2 including the printer 111 and PC 101.

In PC 101, a communication interface unit 203 is constituted of a host controller, a port drive, a hub driver and the like respectively for controlling USB bidirectional communications. This unit is generally built in an operation system.

An interruption controller 204 notifies an interrupt event to an application 202, the interrupt event being generated upon operation of the printer operation panel and transferred through interrupt transfer.

The event to be notified includes: a print setting information event for notifying a change in print setting information such as a paper size, a print quality, and print object image data; a storage event for notifying storage; a delete event for notifying deletion; and a print control event for notifying a print start, a print abort and the like. An event may also be used by including status information including a printer operation state, resource information such as an ink remaining amount and a recording medium, error information and the like. The operation panel 204 may be used for an image correcting process such as a color correcting process, rotation, and trimming to notify an interrupt process corresponding to the operation of the operation panel to PC.

The interruption controller 204 of the embodiment generally corresponds to an HID (Human Interface Device) class device of USB used with a mouse and keyboard, and is constituted of a class driver and its management software. The interruption controller 204 notifies an interrupt event generated in the printer to an application 202 without any delay so that the operation of the operation panel can be reflected in real time upon the operation of a storage application 202 running on PC.

This interrupt controller 204 is generally built in the operation system.

The storage application 202 performs a storage process of storing image data on a memory card inserted into the card slot of the printer onto the hard disk and a print process of printing the stored image data and the image data in the printer.

The print control of the storage application 202, including start-up, end, print setting, image selection, print start, print abort and the like, is performed by using the operation panel of the printer.

Software constituting the storage application 202 will be described in the following.

In the storage application 202, an event receiving unit 206 judges an interrupt even received from the interruption controller 204. If a print setting information event is received, the event is notified to a print setting information management unit 207. If a storage event or a delete event is received, the event is notified to a storage (preserved) data information management unit 209, whereas if a print control event such as a print start and a print abort is received, the event is notified to the print control unit 211.

Upon reception of the print setting information event, the print setting information management unit 207 stores the print setting information in a print setting information buffer 208 of RAM 103 (FIG. 2). The print setting information event is constituted of a print mode presently selected by the printer, an image data ID, a paper size, a paper kind, a print quality, a layout ID, the number of copies, image correction information and the like. The image data ID identifies image data to be printed, from the image data on the memory card of the printer and the image data in the storage data area 210 of PC, and is constituted of a file name, a file number and position information.

Upon reception of the storage event, the storage data information management unit 209 acquires the image data corresponding to the storage information from the printer 111 and stores it in the storage data area 210 of the hard disk.

The storage data information management unit 209 notifies the storage information together with information on a change in the storage information to the printer 111. It is assumed that this notice of the storage information is also performed at the communication start between the printer 111 and PC 110 at the timing of power-on or other timings.

It is therefore possible for the printer to know the image data stored in PC and select the storage data in PC 101 as the print target by using the operation panel of the printer 111.

The print control unit 211 receives the print control event and judges it. If the event indicates a print start request, the print start request is notified to the print data generation unit 212. If the event indicates a print abort request, the print abort request is notified to the print data generation unit 212.

The print data generation unit 212 acquires current print setting information from a print information setting information buffer via the print setting information management unit 207, and if image data to be printed exists on the memory card of the printer, it acquires the image data from the printer. If the image data to be printed exists in the storage data area 210 of PC, it acquires the image data via the storage data information management unit 209. Next, in accordance with the print setting information, the print data generation unit 212 converts the acquired image data which is multi-value bit map data of an RGB full-color, into binary raster format bit map data of yellow (Y), magenta (M), cyan (C) and black (K) by a variable magnification process, a half-tone process, a complementary color conversion process, a binarization process or the like, to generate a printer command from this converted bit map data. The print data generation unit 212 sends the generated printer command to the printer 111 via the data transmission unit 213.

The printer 111 has a function of printing image data supplied from PC and a direct print function of printing image data on the memory card by itself. The printer 111 has as a user interface and the operation unit (operation panel) 119 constituted of the liquid crystal panel, various buttons/switches and LED.

An operation panel controller 220 controls the operation panel 119 constituted of the liquid crystal panel to store operation panel information in a operation panel information buffer 221.

The operation panel controller 220 generates various interrupt events described above and transmits them to PC via a communication interface 215.

The operation panel controller 220 stores storage data information transmitted from PC 101 into an operation panel information buffer 221 so that the image data in PC 101 can be selected as the print target, similar to the image data on the memory card.

A memory card controller 219 operates to read out image data from a storage medium inserted into the card slot.

When the print start button 910 (FIG. 1) of the operation panel 119 is depressed, a direct print controller 218 operates to read out the operation panel information stored in the operation panel information buffer 221, and in accordance with this information, acquires the image data from the memory card controller 219 to generate print data.

A print engine unit 217 performs a print process for the direct print process by using the print data generated by the direct print controller.

For the print process of image data in PC 101, the print process is performed in accordance with the printer command received at a communication interface unit 215.

The configuration and operation of the printing system according to the preferred embodiment has been described above.

Figure 4:
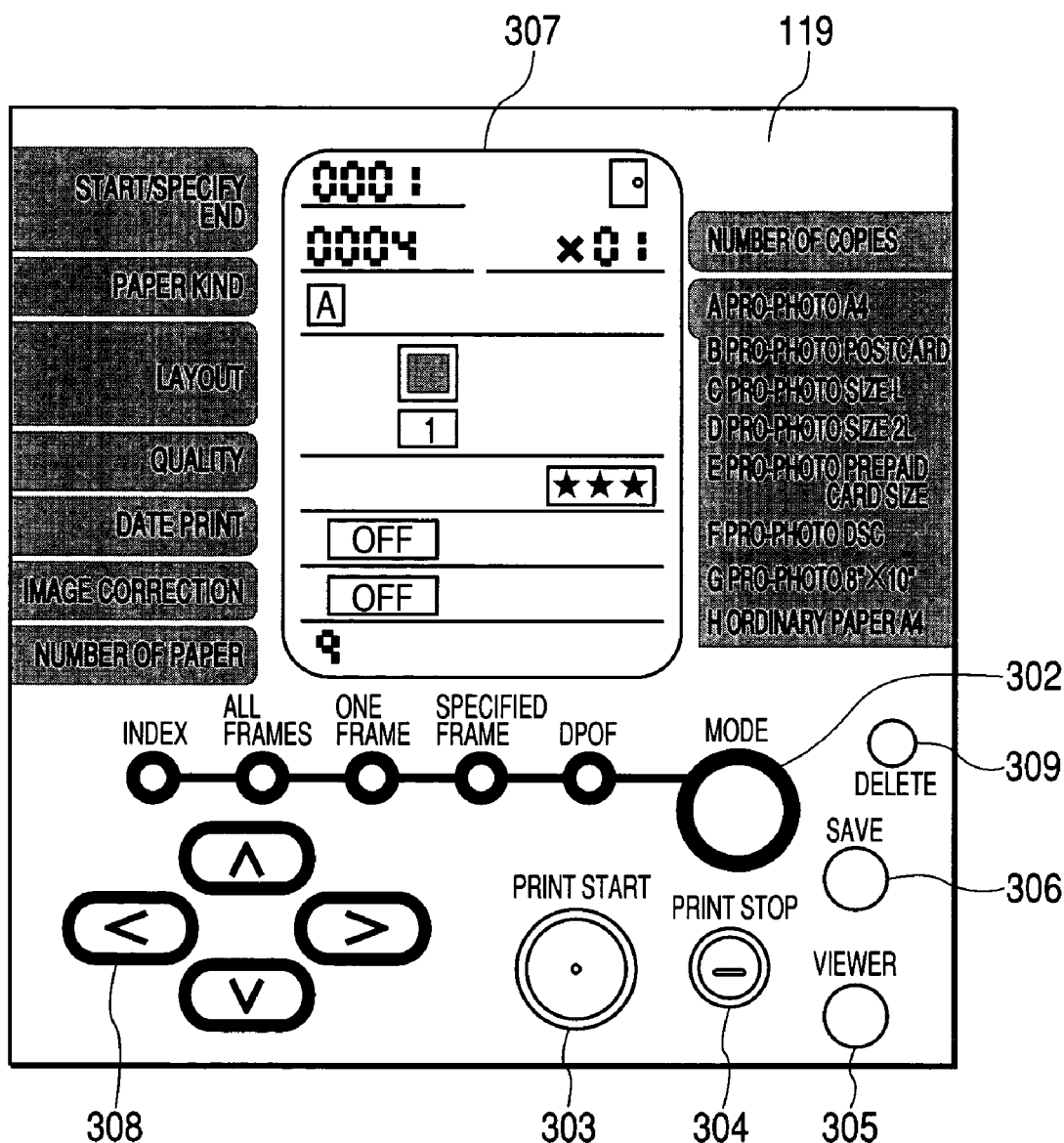
FIG. 4 is a plan view showing the detailed structure of an operation panel of a printer shown in FIG. 2.

FIG. 4 is a plan view showing the detailed structure of the operation panel 119 of the printer 111 shown in FIG. 2.

In an operation panel (corresponding to the operation panel 906 shown in FIG. 1) 119, reference numeral 308 denotes print setting buttons which are used for selecting an item displayed on a liquid crystal panel 307. Reference numeral 302 denotes a mode selection button which is used to select a print mode in a toggle manner, including an index mode, a full-frame mode, a one-frame mode, a designated frame mode, a DPOF mode and the like. Depending upon a selected print mode, it is decided whether a setting item is required to be selected or not.

A print start button (corresponding to the print start button 910 shown in FIG. 1) 303 is used for starting a buffered print or a direct print. While the printer 111 and PC 101 can communicate, the interruption controller 204 is supplied with an interrupt event (print control event (including information of image data to be printed)) via the operation panel controller 220 and communication I/F units 215 and 203, to perform a print operation processed by PC 101 without the direct print. Reference numeral 304 denotes a print abort button which is used for aborting the print process.

A viewer button (corresponding to the viewer button 909 shown in FIG. 1) 305 activates the application 202 on PC 101 shown in FIG. 3 to perform a preview display. When this viewer button 305 is depressed, an interrupt event is supplied to the interrupt controller 204 via the operation panel controller 220, communication I/F units 215 and 203.

A liquid crystal panel (corresponding to the liquid crystal panel 907 shown in FIG. 1) 307 is used for displaying a current printer state and current print setting. While a user confirms each item displayed on this liquid crystal panel 307, the user operates the print setting select buttons 308 to select each of various items including a print mode, a print start image number (storage start number, delete start number), print end image number (storage end number, delete end number), the number of copies, a paper kind, a paper size, a layout, a print quality, dated print, image correction, and the number of papers.

A save button (corresponding to the save button 911 shown in FIG. 1) 306 is used for storing image data on the memory card into PC 101. When this save button 306 is depressed, an interrupt event (storage event (including information of image data to be stored)) is supplied to the interruption controller 204 via the operation panel controller 220 and communication I/F units 215 and 203.

A delete button (corresponding to the delete button 912) shown in FIG. 1) 309 is used when the image data stored in PC 101 upon depression of the save button 306 is deleted from PC 101. When the delete button 309 is depressed, an interrupt event (delete event (including information of image data to be stored) is supplied to the interruption controller 204 via the operation panel controller 220 and communication I/F units 215 and 203.

Figure 5:
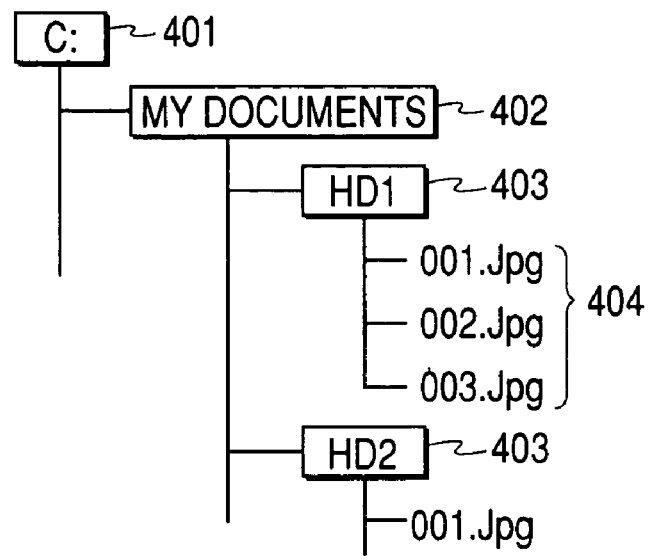
FIG. 5 is a schematic diagram showing storage destinations of image data stored in PC by operating a save button shown in FIG. 4.

FIG. 5 is a schematic diagram showing the storage destinations of image data stored in PC 101 upon operation of the save button 306 shown in FIG. 4.

Referring to FIG. 5, a storage area of storage data (image data stored in PC 101 upon operation of the save button 306) is set under an existing OS folder 402 and in drive C 401 of the hard disk 105, and at this level a printer folder 403 is created. In this printer holder 403, image data 404 on the memory card is stored. Each time the save button 306 is depressed, a printer holder is formed and image data is stored therein.

By designating the storage destination, image data in the host PC can be selected definitely from the printer operation panel. When stored image data in the host PC is to be selected from the operation panel, a display indicating image data in the host PC and image data on the memory card is given on the liquid crystal panel (as will be shown in FIG. 6 later).

When the print start button 303 is depressed after the completion of print setting, selected image data in PC 101 or selected image data on the memory card is accessed to be printed. When the print abort button 304 is depressed during the print, the print operation under execution is aborted.

Figure 6:
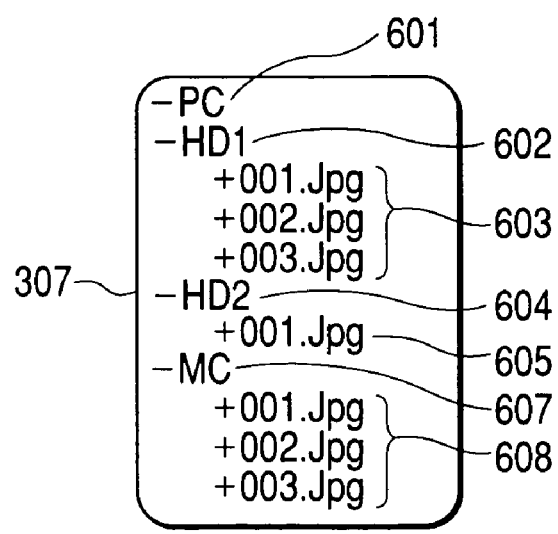
FIG. 6 is a schematic diagram showing an example of an image data selection window displayed on a liquid crystal panel shown in FIG. 5.

FIG. 6 is a schematic diagram showing an example of an image data select window displayed on the liquid crystal panel 307 shown in FIG. 4. This screen is displayed when an image selection button (not shown) is depressed. The image is selected by using the keys 308 and when an OK button (not shown) is depressed, the image to be printed is definitely determined.

By using this screen, the image stored in the storage medium of PC can be designated. After the image select window is finished and the liquid crystal panel 307 shown in FIG. 4 is resumed, it is convenient if the designated file names are displayed in place of the "print start image number" and "print end image number".

It is also convenient if an image such as a small icon is displayed on the liquid crystal panel 307 in order to indicate that the image in the storage medium of PC has been designated to be printed.

As shown in FIG. 6, images in the host PC and memory card are displayed on the liquid crystal panel 307 in a tree structure, by displaying numerals and characters: 601 for PC 101; 602 and 604 for HD1 and HD2 shown in FIG. 5; 603 and 605 for image data in HD1 and HD2 shown in FIG. 5; 607 for the memory card of the printer 111; and 608 for the image data on the memory card.

While a user looks at the tree structure display on the liquid crystal panel 307, the user depresses the print setting select button 308 so that a plurality of images to be printed (stored or deleted), the images being stored in PC and on the memory card, can be selected as desired. If the user selects the index mode by using the mode button 302, the image in PC and image on the memory card can be subjected to the index print. In accordance with the index print results of the images in PC and on the memory card, a plurality of images to be printed or deleted may also be selected.

After an image is selected, the print start button 303 or delete button 309 shown in FIG. 4 is depressed to print or delete the image data stored in PC 101 or on the memory card.

Next, the details of the procedure to be executed by the application 202 shown in FIG. 3 will be described.

Figure 7:
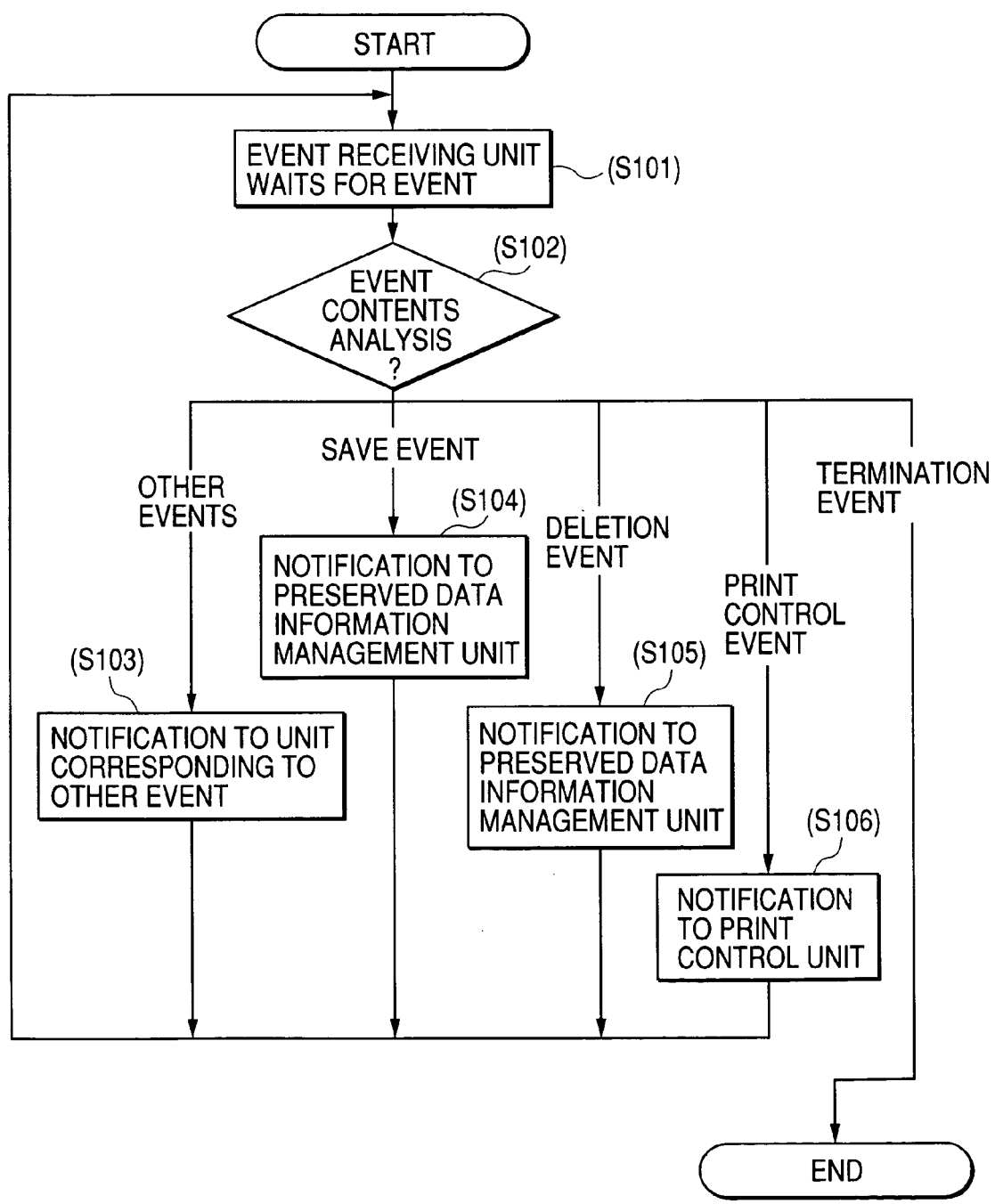
FIG. 7 is a flow chart illustrating an example of a first procedure of processing data to be executed by the printing system of the embodiment.

FIG. 7 is a flow chart illustrating an example of a first procedure of processing data to be executed by the printing system of the invention. This first procedure corresponds to the procedure to be executed by the application 202 (particularly by the event receiving unit 206) shown in FIG. 3. S101 to S106 denote respective steps of the flow chart.

When the application 202 is activated, at Step S101 the event receiving unit 206 waits for an interrupt event to be supplied from the interruption controller 204.

A user depresses the save button 306, delete button 309, print start button 303, viewer button 305 or the like of the operation panel 301 to notify the interrupt event to the printer 111 and PC 101. When the event receiving unit 206 receives the interrupt event, the event contents are analyzed at Step S102. If it is judged that the received event is an event other than the storage (preservation) event, delete event, print event, and end event, the other event is notified to the unit (e.g., the print setting information management unit 207) at Step S103 to thereafter return to Step S101. For example, when the print setting information event is notified to the print setting information management unit 207, the print setting information management unit 207 stores the print setting information in the print setting information buffer 208.

If it is judged at Step S102 that the event contents indicate the storage event, the storage event is notified to the storage data information management unit 209 at Step S104 to thereafter return to Step S101.

If it is judged at Step S102 that the event contents indicate the delete event, the delete event is notified to the storage data information management unit 209 at Step S105 to thereafter return to Step S101.

If it is judged at Step S102 that the event contents indicate the print control event, the print control event is notified to the print control unit 211 at Step S106 to thereafter return to Step S101.

If it is judged at Step S102 that the event contents indicate the end event, the storage application 202 is terminated.

Figure 8:
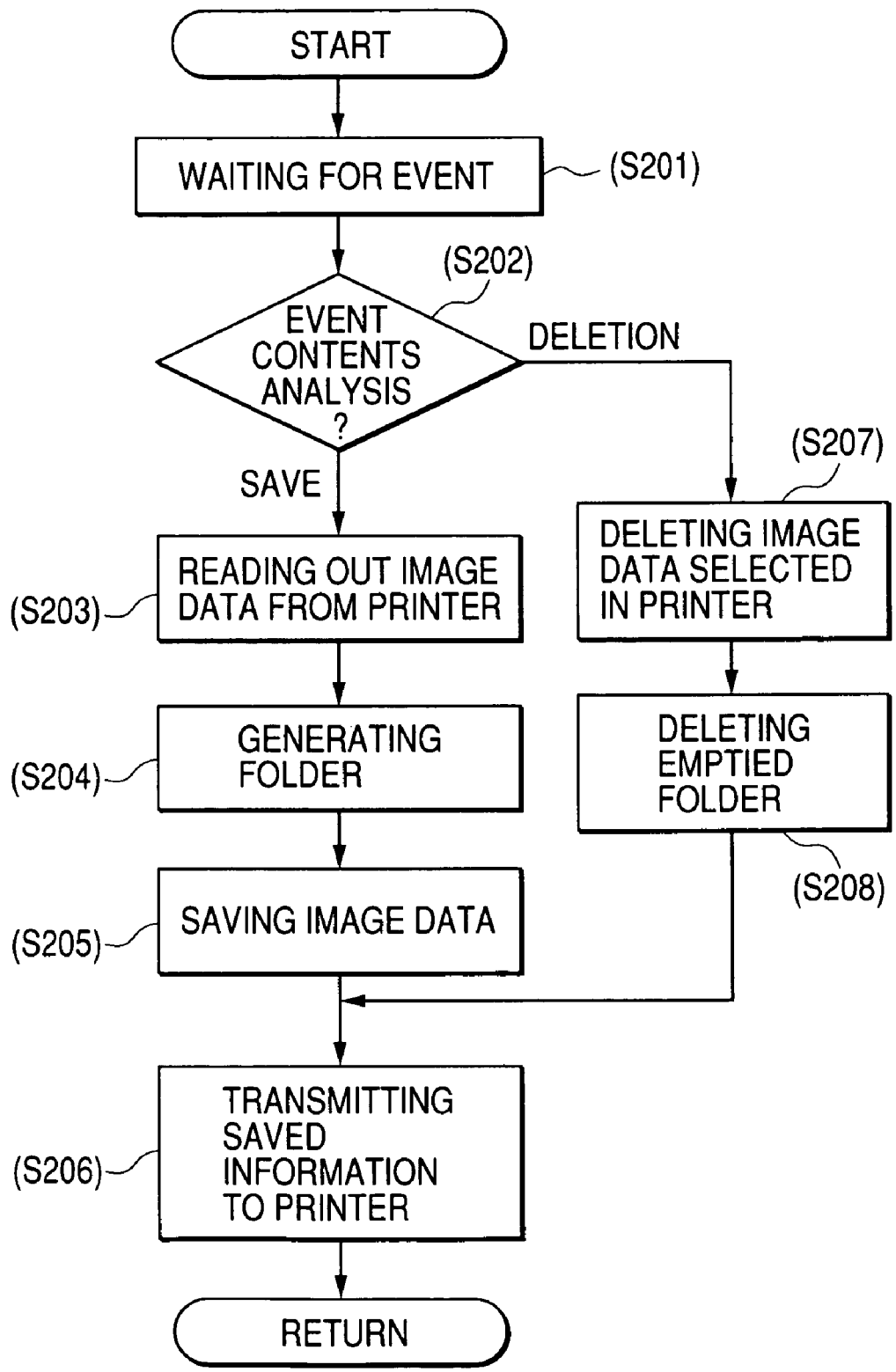
FIG. 8 is a flow chart illustrating an example of a second procedure of processing data to be executed by the printing system of the embodiment.

FIG. 8 is a flow chart illustrating an example of a second procedure of processing data to be executed by the printing system of the invention. This second procedure corresponds to the procedure to be executed by the storage data information management unit 209 shown in FIG. 3. S201 to S208 denote respective steps of the flow chart.

As the procedure starts, the storage data information management unit 209 enters an event wait state at Step S201. Upon reception of the storage event, delete event or the like at Step S104 or S105 shown in FIG. 7, the storage data information management unit 209 analyzes the event contents at Step S202.

If it is judged at Step S202 that the received event is the storage event, at Step S203 the storage data information management unit 209 acquires image data corresponding to the storage image information (information on the image data on the memory card) from the printer 111, generates a folder (data storage area) at Step S204, stores the image data acquired from the printer 111 in the holder at Step S205, and transmits at Step S206 a notice representative of a change in the storage information along with the storage information to the printer 111 to thereafter return to Step S201.

If it is judged at Step S202 that the received event is the delete event, at Step S207 the storage data information management unit 209 deletes image data corresponding to the delete image information (information on the image data instructed to be deleted by the printer) from the data storage area, deletes at Step S208 an empty holder, if any, formed by the delete process at Step S207, and at Step S206 transmits a notice representative of a change in the storage information along with the storage information to the printer 111 to thereafter return to Step S201.

Figure 9:
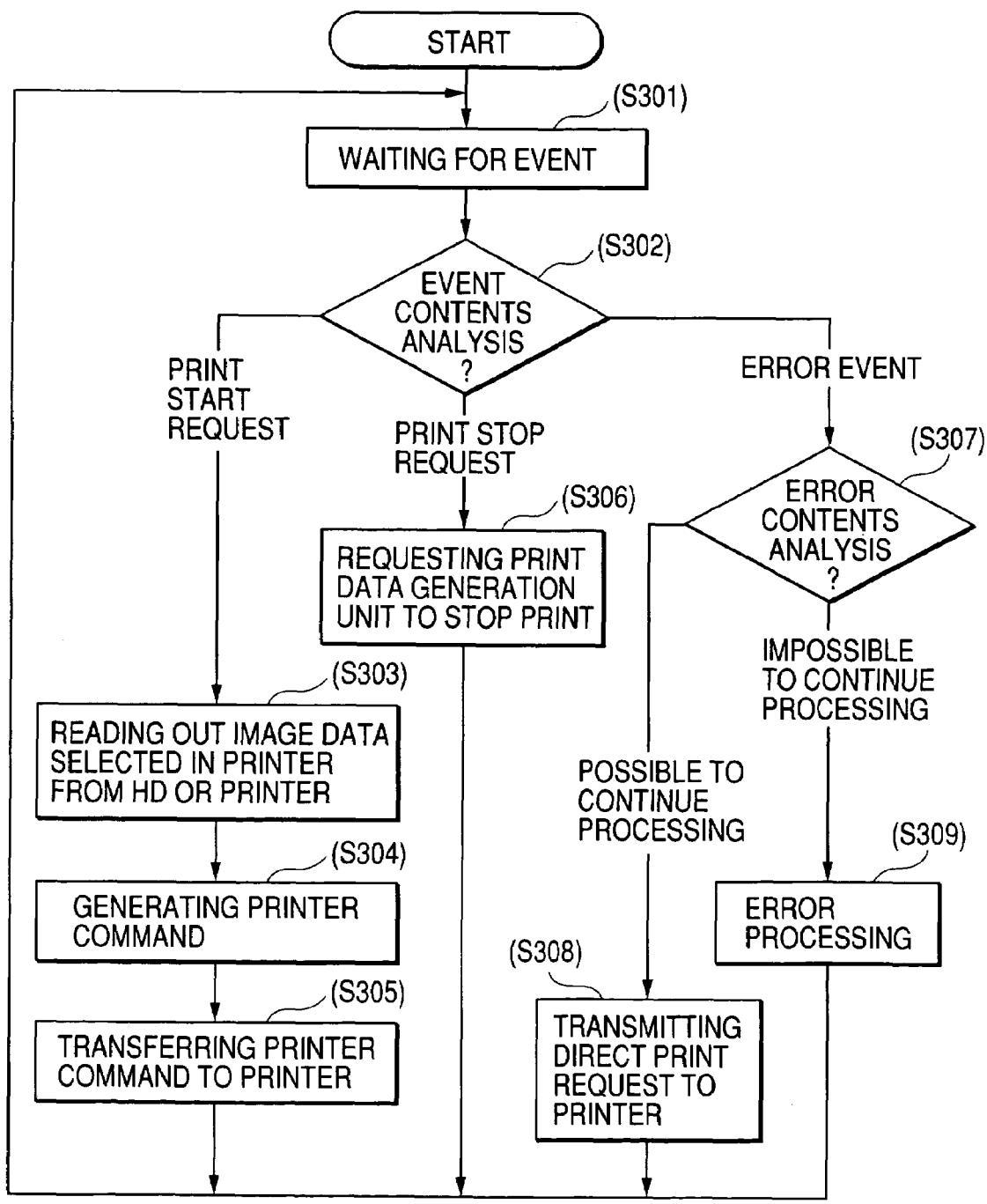
FIG. 9 is a flow chart illustrating an example of a third procedure of processing data to be executed by the printing system of the embodiment.

FIG. 9 is a flow chart illustrating an example of a third procedure of processing data to be executed by the printing system of the invention. This third procedure corresponds to the print event procedure at Step S106 shown in FIG. 7. S301 to S309 denotes respective steps of the flow chart.

As the procedure starts, the print control unit 211 enters an event wait state at Step S301. Upon reception of the print control event or the like at Step S106 shown in FIG. 7, the print control unit 211 analyzes the event contents at Step S302.

If it is judged at Step S302 that the received event is the print start event (request), at Step S303 the print data generation unit 212 acquires current print setting information from the print setting information buffer 208 via the print setting information management unit 207. If the image data to be printed exists on the memory card of the printer, the image data is acquired from the printer, whereas if the image data exists in the data storage area of PC, the image data is acquired via the storage data information management unit 209 and stored in RAM 103 or in a temporary area of the hard disk 105.

At Step S304, the print data generation unit 212 converts the image data which is multi-value bit map data of an RGB full-color, into binary raster format bit map data of yellow (Y), magenta (M), cyan (C) and black (K) by a variable magnification process, a half-tone process, a complementary color conversion process, a binarization process or the like, to generate a printer command from this converted bit map data.

Next, at Step S305 the print data generation unit 212 transmits the generated printer command to the printer 111 via the data transmission unit 213 to thereafter return to Step S301.

If it is judged at Step S302 that the received event is the print abort event (request), at Step S306 the print control unit 211 aborts the print process of the print data generation unit 212 to thereafter return to Step S301.

If it is judged at Step S302 that the received event is an error event from the print data generation unit 212, at Step S307 the error contents are analyzed. If although the process at PC 101 can continue, a printer command generation process or the like by the print data generation unit 212 is difficult to be executed, because of insufficient resources, it is judged that the procedure can continue. In this case, at Step 308 the image data stored only in PC 101 is transmitted to the printer 111 to request the printer 111 to perform the direct print and thereafter return to Step S301.

If it is judged at Step S307 from the analysis of the error contents that the procedure at PC 101 is impossible to be continued, at Step S309 an error process such as an error display is performed to thereafter return to Step S301.

As described above, according to the printing system of the invention, image data stored in PC upon operation of the operation panel of the printer can be selected and printed by using the operation panel of the printer.

Both image data stored on the recording medium inserted into the card slot of the printer and stored in PC can be selected at a time and synthesized to be printed in the same layout. Conventionally, only a plurality of images recorded on the same memory card can be designated. In the embodiment, however, even past images not stored on the same memory card can be printed in a synthesized manner only upon operation of the operation unit of the printer.

In this embodiment, when the save button 306 is depressed, all image data stored on the memory card mounted on the printer is stored in the hard disk of PC. Instead, only image data selected by a user may be stored on the hard disk of PC, similar to the print process and delete process.

Also in this embodiment, when the save button 306 is depressed, image data on the memory card mounted on the printer is stored onto the hard disk of PC. Image data in a digital camera connected to the printer may be stored onto the hard disk of PC.

When image data on the memory card mounted on the printer is printed, the image data may be stored automatically onto the hard disk of PC. This can be realized by copying the image data stored in the temporary area at Step S303 shown in FIG. 9 to the data storage area 210 (holder 403 shown in FIG. 5).

The printer engine unit of the printing system of the invention may be an ink jet type, an electronic photographing type such as a laser beam type and an LED type, a liquid crystal shutter type, a thermal transfer type, a sublimation type or other print types.

The structure combining the above-described application examples is intended to be included in the scope of the invention.

Next, with reference to FIG. 10 showing a memory map, description will be made on the structure of a data processing program readable by the printing system of the invention.

FIG. 10 is a schematic diagram showing a memory map of a storage medium for storing various data processing programs readable by the printing system of the invention.

Although not shown, information for managing a program group stored on the storage medium, such as version information and a creator name, is also be stored, and information dependent upon an OS or the like on the program read side, such as an icon for displaying a program in a discriminable way, may be stored.

Data belonging to each program is managed by the directory. If a program or data to be installed is compressed, an expanding or defrozing program or the like may be stored.

The functions of the embodiment shown in FIGS. 7 to 9 may be realized by a host computer by running a program installed from an external. In this case, the invention is applicable to the case wherein an information group including programs is supplied to an output device from a recording medium such as a CD-ROM, a flash memory and an FD or from an external storage medium via a network.

It is obvious that the object of the invention can be achieved by supplying a storage medium storing software program codes which realize the functions of the embodiment to a system or apparatus and by making a computer (or CPU or MPU) of the system or apparatus read and execute the program codes stored in the storage medium.

In this case, the program codes themselves read out from the storage medium realize the novel functions of the invention. Therefore, the storage medium storing the program codes constitute the invention.

The storage medium for storing such program codes may be a flexible disk, a hard disk, an optical disk, a magneto optical disk, a CD-ROM, a CD-R, a DVD-ROM, a magnetic tape, a nonvolatile memory card, a ROM, an EEPROM, a silicon disk or the like.

It is obvious that the invention includes the case wherein not only the computer executes the read-out program codes to realize the embodiment function but also an OS (operating system) running on the computer performs a portion or the whole of actual processes in accordance with instructions of the program codes to realize the embodiment function.

It is obvious that the scope of the invention also contains the case wherein the functions of each embodiment can be realized by writing the program codes read from the storage medium into a memory of a function expansion board inserted into a computer or of a function expansion unit connected to the computer, and thereafter by executing a portion or the whole of actual processes by a CPU of the function expansion board or function expansion unit.

The invention is also applicable to a system having a plurality of apparatuses or to a single apparatus. It is obvious that the invention is applicable to the case wherein a system or apparatus is supplied with programs to realize the embodiment function. In this case, the system or apparatus reads the software program codes realizing the functions of the invention and stored in a storage medium and achieves the advantageous effects of the invention.

The system or apparatus may obtain the advantageous effects of the invention by downloading the software programs realizing the functions of the invention from a database on a network by using a communication program.

As described so far, according to the printing system of the invention, each time a first predetermined button mounted on an operation panel of a printer is operated, an interrupt event transferred from the printer to a host computer is detected at the host computer, and in accordance with the detected interrupt event, image data read out from an external memory readable by the printer is stored in a storage area of the host computer, whereas each time a second predetermined button mounted on the operation panel of the printer is operated, an interrupt event transferred from the printer to the host computer is detected at the host computer, and in accordance with the detected interrupt event, image data read out from the external memory and image data stored in the storage area is selected at a time to be printed in the same layout. Image data stored in the host computer in the past can be easily printed at any time upon operation of the operation panel of the printer.

The invention is not limited only to the above-described embodiment, but various modifications are possible without departing the scope of the invention as defined in the following claims.

What is claimed is:

1. A printing system which includes a printer and a computer each including a communication interface for transferring information therebetween, wherein said printer comprises:
   an operation panel for entering a store instruction and a print instruction of image data to be read out from a memory readable by said printer, said operation panel entering a select instruction and a delete instruction for data stored in said computer in accordance with the storage information;
   an operation panel controller for notifying the instruction entered from said operation panel to said computer by generating an interrupt event and notifying said computer of the generated interrupt event in an interrupt transfer method, said operation panel controller generating delete request information corresponding to the delete instruction from said operation panel and issuing the interrupt event of the generated information to said computer; and
   a printer engine for printing,
   wherein said computer comprises:
      a data transfer unit for transferring and receiving, in a bulk transfer method, an image and print data to and from said printer;
      an interrupt controller for detecting the interrupt event notified from said printer in the interrupt transfer method;
      a storage control unit for storing data from said memory into a storage area in accordance with the interrupt event detected by said interrupt controller; and
      an output control unit for outputting as print data the data stored in said storage area to said printer in accordance with said notified interrupt event.

2. A printing system according to claim 1, wherein said computer further comprises a storage information management unit for transmitting storage information to an external apparatus, the storage information being representative of storage destination information of data stored in response to a storage request of the interrupt event,
   wherein said operation panel can enter a print instruction of data in said computer in accordance with the storage information, and
   wherein said operation panel controller generates the interrupt event in response to the select instruction or the print instruction from said operation panel.

3. A printing system according to claim 2, wherein said storage information management unit deletes data stored in the storage area in response to a delete request of the interrupt event.

4. A printing system according to claim 1, wherein said operation panel can enter a synthesized print instruction with selecting both image data stored in said computer and image data in the memory readable by said printer.

5. A control method for a printing system which includes a printer and a computer each including a communication interface for transferring information therebetween, the control method comprising:
   a first detecting step of, each time a first predetermined button mounted on an operation panel of said printer is operated, detecting an interrupt event transferred from said printer to said computer in an interrupt transfer method;
   a storing step of, in accordance with the interrupt event detected in said first detecting step, effecting control to store image data transferred in a bulk transfer method from an external memory readable by said printer into a storage area of said computer;
   a second detecting step of, each time a second predetermined button mounted on the operation panel of said printer is operated, detecting an interrupt event transferred in an interrupt transfer method from said printer to said computer;
   an output step of outputting, in the bulk transfer method, image data stored in the storage area to said printer, as print data in accordance with the interrupt event detected by said detecting step; and
   a generating step of generating delete request information corresponding to an instruction from a third button mount on the operation panel for entering a delete instruction of the data in the storage area, and generating an interrupt event for the generated information to said computer.

6. A control method according to claim 5 further comprising a storage information transmission step of transmitting storage information from said computer to said printer, the storage information being representative of storage destination information of data stored in response to a storage request of the interrupt event, wherein said second detecting step generates an interrupt event for selecting the data in the storage area of said computer in accordance with the storage information and in response to an instruction by the second button.

7. A computer-readable storage medium storing a computer-executable program code for realizing a control method for a printing system which includes a printer and a computer each including a communication interface for transferring information therebetween, said control method comprising:

a first detecting step of, each time a first predetermined button mounted on an operation panel of said printer is operated, detecting an interrupt event transferred in an interrupt transfer method from said printer to said computer;

a storing step of, in accordance with the interrupt event detected in said first detecting step, effecting control to store image data transferred in a bulk transfer method from an external memory readable by said printer into a storage area of said computer;

a second detecting step of, each time a second predetermined button mounted on the operation panel of said printer is operated, detecting an interrupt event transferred in the interrupt transfer method from said printer to said computer;

an output step of outputting, in the bulk transfer method, image data stored in the storage area to said printer, as print data in accordance with the interrupt event detected by said detecting step; and a generating step of generating delete request information corresponding to an instruction from a third button mount on the operation panel for entering a delete instruction of the data in the storage area, and generating an interrupt event for the generated information to said computer.

8. A computer-executable program stored on a computer-readable storage medium, for realizing a control method for a printing system which includes a printer and a computer each including a communication interface for transferring information therebetween, the control method comprising:

a first detecting step of, each time a first predetermined button mounted on an operation panel of said printer is operated, detecting an interrupt event transferred in an interrupt transfer method from said printer to said computer;

a storing step of, in accordance with the interrupt event detected in said first detecting step, effecting control to store image data transferred in a bulk transfer method from an external memory readable by said printer into a storage area of said computer;

a second detecting step of, each time a second predetermined button mounted on the operation panel of said printer is operated, detecting an interrupt event transferred in the interrupt transfer method from said printer to said computer;

an output step of outputting, in the bulk transfer method, image data stored in the storage area to said printer, as print data in accordance with the interrupt event detected by said detecting step; and a generating step of generating delete request information corresponding to an instruction from a third button mount on the operation panel for entering a delete instruction of the data in the storage area, and generating an interrupt event for the generated information to said computer.

* * * * *